United States Patent [19]

Forbes et al.

[11] Patent Number: 5,525,667
[45] Date of Patent: Jun. 11, 1996

[54] POLYMER ORIENTATION

[75] Inventors: Alan H. Forbes, Finksburg, Md.;
Harry R. Sheets, Shortsville, N.Y.

[73] Assignee: Tenneco Plastics, Inc., Evanston, Ill.

[21] Appl. No.: 510,370

[22] Filed: Aug. 2, 1995

[51] Int. Cl.$^6$ .................. B29C 55/00; C08J 9/00
[52] U.S. Cl. .................. 524/490; 521/98; 521/146; 264/235.8; 264/290.2; 524/491
[58] Field of Search .................. 524/490, 491; 521/98, 146; 264/235.8, 290.2; 428/910

[56] References Cited

U.S. PATENT DOCUMENTS

| | | | |
|---|---|---|---|
| 4,763,985 | 8/1988 | Bingham | 350/105 |
| 4,980,101 | 12/1990 | Beck et al. | 264/41 |
| 4,994,344 | 2/1991 | Kurtz et al. | 430/273 |
| 5,356,944 | 10/1994 | Blythe et al. | 521/146 |

OTHER PUBLICATIONS

Bikales, Norbert M., "Extrusion and Other Plastics Operatioins," Wiley–Interscience, 1971, pp. 103–132.

*Primary Examiner*—Morton Foelak
*Attorney, Agent, or Firm*—L. Gene Wise

[57] ABSTRACT

A novel biaxially oriented polystrene sheet product and process for making the sheet. Oriented polystyrene sheet is prepared by melt extruding a polymer, such as styrenic resin having average molecular weight of at least 270,000, blended with a processing agent, such as mineral oil, to lower glass transition temperature of the resin by at least 10° C. The cooled extruded sheet is biaxially oriented under reduced orientation load conditions and orientation temperature. In a preferred embodiment styrenic resin is blended with about 3–10 wt % paraffinic hydrocarbon oil, such as mineral white oil or the like, in the substantial absence of other additives to provide a clear, oriented polystyrene sheet product having high modulus and low haze.

2 Claims, No Drawings

POLYMER ORIENTATION

FIELD OF THE INVENTION

This invention relates to improved orientation techniques for making thermoplastic resin film, sheet or foil materials, such as biaxially oriented polystyrene.

BACKGROUND OF THE INVENTION

Oriented Polystyrene (OPS) is produced commercially by biaxial orientation processes. Biaxially orientation of glassy, rigid styrenic polymers makes the resultant sheet material flexible and tough. Although flexibility can be achieved by other techniques, such as incorporation of butadiene rubber or copolymers; these materials are expensive, difficult to process and usually reduce light transmission and clarity.

Conventional OPS processing is described by Bikales in "Extrusion and other plastics operations", Wiley-Interscience, 1971, pp.103–132. Other prior art processes are disclosed by Beck et al in U.S. Pat. No. 4,980,101, which describes manufacture of semipermeable membranes employing a non-solvent mineral oil. During orientation the membrane is heated to temperature between the glass transition temperature and melting point of syndiotactic polystyrene. A type of foam sheet orientation is disclosed in U.S. Pat. No. 5,356,944, wherein Blythe et al suggest addition of mineral oil to polystyrene for lowering melt index. The above references are incorporated by reference.

In a conventional process for producing oriented polystyrene (OPS) virgin high molecular weight polystyrene polymer, reprocessed polymer and a small amount of high impact polystyrene (Hips) modifier resin are fed into a two stage extruder. The material is melted, mixed, degassed and extruded through a flat sheet die, typically at about 1–1.5 mm. (50–60 mils) thickness. The extruded "base" sheet is then passed through a set of cooled calendar or polishing rolls which set the surface.

The base sheet is then thermally preconditioned before being stretched 2–4 times in the Machine Direction. This is accomplished in a conventional stretch roll type Machine Direction Orientor (MDO) by passing the sheet over several sets of rolls with precise temperature control. After the sheet is preconditioned by cooling, it is stretched very rapidly between a slow speed roll and a high speed roll. The speed differential between the slow roll and the fast roll as well as the temperature of the sheet when the stretching occurs determines the Machine Direction (MD) orientation.

Once the stretching is complete the sheet is further temperature conditioned or annealed by passing it over several heat transfer rolls to control the orientation temperature conditions. This annealing is selected to preserve the predetermined level of orientation and prepares the sheet for Transverse Direction (TDO) Orientation.

The sheet then enters a conventional tenter type Transverse Direction Orientor (TDO). During this process step the sheet is mechanically grasped on its edges by clips which are attached to a continuous chain. Unlike the MDO where conduction is used to control the sheet temperature, in the TDO the sheet temperature is controlled by convection. Lateral stretching in the TD is accomplished when the distance between the two chains, which hold the sheet, is increased. During TD orientation the sheet is stretched 2–4 times as the distance between the chains is increased. After the sheet is TD oriented the edges (where the clips held the sheet) are trimmed and recycled to the extruder feed stream. The final sheet product usually has a thickness about 15–25% of the extrusion die. For thermoforming semirigid containers, for instance, a final thickness of about 0.5 mm (15–20 mils) is satisfactory.

Conventional processes for making OPS have a very narrow operating window, in that temperatures must be closely controlled (e.g., ±about 1° C.). If the temperature is too low the sheet may stick to the MDO rolls creating a process loss and/or poor sheet visual quality. If the temperature is too high the orientation may be incorrect or thickness gauge control is sacrificed and the final product strength uniformity is unacceptable. Once the edge trim is recovered, the sheet is cooled and optionally roll-coated on both sides with a silicone water solution. This coating serves two purposes. First it provides a mold release. Once produced, the OPS sheet or web stock material can be later thermoformed into clear packaging components, stackable containers or the like. The silicone coating allows the finished parts to be separated easily from the plug assist molds. Without this coating mold jams are prevalent. Secondly, the coating acts as denesting agent. Finished OPS containers are typically stacked one on top of another, with a large amount of surface contact area. Conventional uncoated sheet produces parts may not readily separate from each other or "denest".

SUMMARY OF THE INVENTION

An improved process has been found for making clear oriented polystyrene sheet, including the steps of: melt extruding a high molecular weight styrene resin having average molecular weight of at least 270,000 blended with resin-compatible plasticizer, such as mineral oil or the like, in amount sufficient to plasticize the resin and to lower glass transition temperature of the resin by at least 10° C.; cooling the extruded sheet below the glass transition temperature of the plasticized resin; and biaxially orienting the polystyrene sheet. The orientation can be effected under reduced orientation load conditions and reduced orientation temperature to produce a clear oriented polystyrene sheet that can be thermoformed at reduced temperature.

In the preferred process, orientation is effected by stretching the extruded sheet about 2–4 times at a temperature less than 100° C., and the plasticizer consists essentially of food grade white mineral oil or equivalent oil in an amount of 3–10 wt %, preferably at least 5 weight percent, based on the resin.

It has been found that a minor amount of hydrocarbon oil blended with high molecular weight polystyrene will improve product clarity, reduce energy costs, maintain product rigidity, eliminate the need for expense impact modifiers, enlarge the orienting and thermoforming process window and may eliminate the need for silicone coating.

DETAILED DESCRIPTION OF THE INVENTION

In the following description, metric units and parts by weight are employed unless otherwise indicated. Polystyrene homopolymer (e.g.- BASF 1800/1900) resin are used as the primary base polymer.

The additive oil is preferably a clear, non-volatile liquid having lubricating and plasticizing properties. Typically hydrocarbon oils having 20 to 40 carbon atoms are compatible with styrenic resins and impart the desired properties when used in appropriate amounts. Aliphatic $C_{20}$–$C_{30}$ hydrocarbons, such as branched-chain paraffins, are light stable and substantially inert, which properties are important for food packaging and display use. Synthetic hydrocarbons having similar properties to mineral oil may also be employed. While the amount of oil added to the base resin can exceed 5–10 wt %, excessive amounts can degrade product quality. Therefore, the preferred amounts are in the range of about 3–10 wt % of the resin weight.

Petroleum-based white mineral oils are highly refined, water-white products made from lubricating oil distillates. These oils are complex mixtures of saturated hydrocarbons including straight chain, branched, ring structures and molecules containing all three configurations. White mineral oils typically have carbon numbers in the $C_{15}$ through $C_{30}$ range. The relative number of saturated ring structures and straight or branched chain structures will determine whether the oil is characterized as naphthenic or paraffinic in nature. White mineral oils are obtained from the intensive treatment of a petroleum fraction with sulfuric acid or oleum, by hydrogenation, or by a combination of sulfuric acid treatment and hydrogenation. The petroleum fraction is obtained commercially by atmospheric and vacuum distillation to isolate the desired boiling range and viscosity and then solvent treated and dewaxed to remove polar compounds, aromatics and waxes.

Two United States Food & Drug Administration regulations govern the use of white oil and mineral oils for food grade applications: 21CFR 172.878 (Specifications for qualification as a white mineral oil); and 21CFR 178.3620 (Specifications for white oils for applications involving incidental food contact). 21CFR 172.878 includes specifications for ultraviolet (UV) light absorbance, readily carbonizable substances and sulfur compounds. There are new alternatives to white mineral hydrocarbon lubricants for use in food and pharmaceutical applications, including certain synthetic liquids exhibit properties that are essentially equivalent to white oils for purposes of the invention.

Hydrogenated oligomers of 6–12 carbon atom alpha olefins, as described in U.S. Pat. Nos. 3,382,291, 3,149,178 and 3,725,498 represent such a class of synthetic liquids. In addition to possessing desirable physical characteristics, hydrogenated polyalpha olefin materials may offer an advantage over conventional due to their polymeric nature and controlled molecular weight. Polyalpha olefin materials are expected to be poorly absorbed when ingested orally. The non-absorbability of hydrogenated polyalpha olefins diminishes the likelihood of accumulation in human tissues, thus leading to a safer non-toxic product.

In one embodiment of the present invention there is provided a synthetic hydrocarbon-based material for use in making polystyrene sheet for foods and pharmaceuticals, comprising a hydrogenated oligomer of one or more alpha olefins. These synthetic hydrocarbons are made by (a) polymerizing an alpha-olefin having 5 to 20 carbon atoms (e.g.-decene; (b) distilling the oligomer prepared in step (a), thereby obtaining a fraction containing C20+ material; and (c) saturating the residual fraction produced in step (b) by hydrogenation.

Due to the volatility of additive oil at extrusion temperatures of about 275°–300° C., surface defects may appear with the use of lower molecular weight materials, especially those in the $C_{15}$–$C_{23}$ range which have very high vapor pressures at extrusion temperature. Accordingly, the relatively non-volatile $C_{24}$–$C_{30}$ hydrocarbons are preferred as the dominant material of the plasticers for use in high temperature application.

Table I shows the summary results of experiments conducted on standard orientation equipment. The Table shows a comparison of standard coated sheet with impact modifier, ultra high molecular weight polystyrene and HMW-PS with 5% mineral oil. The data shows that the coefficient of friction (COF) for the sheet with mineral oil is comparable to standard coated sheet. The data also confirms that the beam modulus, a measure of sheet stiffness, is comparable to or slightly higher for the HMW-PS with mineral oil. This is significant since mineral oil can act as a plasticizer and "weaken" the final product. Also, the maximum load at yield decreases.

TABLE I

MODIFIED OPS SHEET SUMMARY

| Parameter | High Molecular Weight Coated Both Sides With Hips | Ultra High Molecular Weight, No. Coating, No. Hips | High Molecular Weight 5% Mineral Oil No Coating Or Hips |
|---|---|---|---|
| Coefficient of Friction Against Metal [1] | 0.19 | 0.26 | 0.21 |
| Coefficient of Friction Against Itself [1] | 0.39 | 0.43 | 0.34 |
| Haze (%) [3] | 2.69 | 0.94 | 0.94 |
| MD Stress (psi) [2] | 60.8 | 58.8 | 53.4 |
| TD Stress (psi) [2] | 61.1 | 78.2 | 62.7 |
| Gauge (mils) | 14.9 | 15.4 | 14.3 |
| MD Modulus (psi) [4] | 354000 | 382000 | 383300 |
| TD Modulus (psi) [4] | 373660 | 383400 | 391100 |
| MD Load (psi) [4] | 9543 | 9061 | 8441 |
| TD Load (psi) [4] | 10021 | 10140 | 9215 |
| Glass Transition Temp., °C./(°F.) [5] | 103° C./ (217.2° F.) | 103.5° C. (218.3° F.) | 88° C./ (190.9° F.) |
| MDO Temp., °C./(°F.) | 125° C./ (257° F.) | 125° C./ (257° F.) | 97° C./ (207° F.) |
| TDO Temp., °C./(°F.) | 108° C./ (226° F.) | 126° C./ (259° F.) | 98° C./ (208° F.) |
| Thermoformer oven Temp., °C./(°F.) | 427° C./ (800° F.) | 446° C./ (835° F.) | 385° C./ (725° F.) |

[1] Test method: ASTM - D-1894
[2] Test method: ASTM - D-2838-83
[3] Test method: ASTM - D-1003-61
[4] Test method: ASTM - D-638
[5] Test method: ASTM - D-3418

Oriented High Molecular Weight Polystyrene

In the following examples, a general purpose polystyrene control sample (BASF 1800) is compared to a modified high molecular weight polystyrene (BASF 1900) containing 5.0% wt. % white mineral oil. The equipment and processing are identical except as noted in Table II.

TABLE II

OPS PRODUCTION LINE CONDITIONS

|  | Control | Mineral Oil Modified |
|---|---|---|
| Extrusion melt temp (°F./°C.) | 544/284 | 527/275 |
| Output - (PPH) | 4383 | 4210 |
| Extruder energy (HP) | 474 | 438 |
| MDD temps (°F./°C.) |  |  |
| Top cast | 166/74 | 146/63 |
| Middle cast | 132/656 | 118/48 |
| Bottom cast | 164/73 | 141/61 |
| Pre-heat I | 254/123 | 222/106 |
| Pre-heat II | 250/121 | 226/108 |

TABLE II-continued

OPS PRODUCTION LINE CONDITIONS

|  | Control | Mineral Oil Modified |
|---|---|---|
| Slow roll | 255/124 | 233/112 |
| Fast roll | 255/124 | 233/112 |
| Annealing roll | 248/120 | 230/110 |
| TDO temp (°F/°C) |  |  |
| Zone 1 | 249/121 | 201/94 |
| Zone 2 | 250/121 | 219/104 |
| Zone 3 | 247/119 | 218/103 |
| Zone 4 | 244/118 | 210/99 |
| Zone 5 | 245/118 | 205/96 |

Properties of the two resins and resulting OPS sheet are given in Table III.

TABLE III

| Result | BASF 1800 | BASF 1900 5% Min. Oil |
|---|---|---|
| Cast Sheet |  |  |
| Tensile modulus MD (PSI) | 241,100 | 259,800 |
| Tensile modulus TD (PSI) | 243,800 | 268,700 |
| Tensile % strain to break MD | 2.54 | 3.05 |
| Tensile % strain to break TD | 3.16 | 2.61 |
| Tensile toughness MD (in-#/in$^3$) | 61.4 | 100.3 |
| Tensile toughness TD (in-#/in$^3$) | 93.5 | 64.0 |
| Tensile max load MD (lbs) | 152.7 | 197.9 |
| Tensile max load TD (lbs) | 180.3 | 165.2 |
| Flexural modulus MD (PSI) | 502,400 | 503,200 |
| Flexural modulus TD (PSI) | 518,300 | 512,100 |
| Flexural energy to break MD (in/lbs) | 1.46 | 0.38 |
| Flexural energy to break TD (in-lbs) | 1.05 | 0.37 |
| Flexural displacement to Yield MD (in) | 0.122 | 0.055 |
| Flexural displacement to Yield TD (in) | 0.105 | 0.056 |
| Oriented Sheet |  |  |
| Tensile modulus MD (PSI) | 343,700 | 342,600 |
| Tensile modulus TD (PSI) | 330,300 | 329,200 |
| Tensile % strain to break MD | 3.4 | 3.1 |
| Tensile % strain to break TD | 3.0 | 3.4 |
| Tensile toughness MD (in-#/in$^3$) | 154.2 | 121.4 |
| Tensile toughness TD (in-#/in$^3$) | 118.9 | 149.7 |
| Tensile max load MD (lbs) | 90.6 | 84.1 |
| Tensile max load TD (lbs) | 84.8 | 93.0 |
| Material Characteristics - Bulk |  |  |
| Wt Avg mol. weight pellets ($M_w$) | 329,041 | 393,768 |
| Number avg mol weight pellets ($M_n$) | 129,107 | 154,485 |
| Polydispersity pellets ($M_w/M_n$) | 2.55 | 2.55 |
| Wt Avg Mol Weight Sheet ($M_w$) | 302,983 | 335,996 |
| Number Avg Mol Weight Sheet ($M_n$) | 131,885 | 151,490 |
| Polydispersity sheet ($M_w/M_n$) | 2.30 | 2.22 |
| Glass transition ($T_g$)(°C.) | 103 | 88.4 |
| Melt Index (g/10 min. @ 200° C.) | 1.75 | 2.56 |

Methodology:
Tensile tests: ASTM D-638
Flexural test: ASTM D-790
Glass Transition: ASTM D-3418 @ 10° C./min.
melt index: ASTM D 1238

The oriented sheet produced by the above process was clear 15 mil stock material suitable for use in thermoforming food containers or the like. In addition to the 8% savings in extrusion energy, significant heat savings are shown for the MDO/TDO operations, resulting in overall energy savings of at least 15% compared to the general purpose polystyrene control.

Addition of mineral oil to high molecular weight polystyrene (MWavg=270,000 400,000) having a melt index less than 2 can drastically increase the process operating window. The roll temperatures in the MDO can be decreased from about 125° C. to below 100° C. (e.g.- 257° F. to 207° F.) when 5% by weight mineral oil is added to the standard high molecular weight polystyrene (HMW-PS). Also the mineral oil appears to plasticize the resin and lubricate the roll surfaces, allowing a crystal clear finish on the sheet (eliminated sheet sticking to the roll surfaces). In a comparative test, OPS sheet haze is reduced from 2.69% on the standard sheet to less than 1% using HMW-PS and 5% mineral oil.

With respect to the thermoforming process and resulting product, several trends are observed. The mineral oil reduces the glass transition temperature and consequently all the processing temperatures are reduced. These process conditions can achieve significant energy savings. Additionally the mineral oil product easily releases from the plug assist mold process and readily denests from a stack of formed articles.

While the invention has been demonstrated by specific examples, there is no intent to limit the inventive concept except at set forth in the claims.

We claim:

1. Biaxially oriented clear plasticized polystyrene sheet consisting essentially of 90–97 wt. % polystyrene homopolymer resin and 3–10 wt. % paraffin oil plasticizer; said polystyrene resin having glass transition temperature (Tg) greater than 100° C., melt index less than 2 and molecular weight (Mw) of 270,000 to 400,000;

said paraffin oil consisting predominantly of $C_{20}$ to $C_{40}$ normally liquid hydrocarbons having a normal boiling point greater than 275° C.;

said biaxially oriented plasticized sheet having a glass transition temperature less than 100°, tensile strain to break of at least 3% and increased tensile toughness; and said biaxially oriented plasticized sheet being optically transparent with haze not greater than 1%.

2. The biaxially oriented sheet of claim 1 where in non-volatile $C_{24}$–$C_{30}$ hydrocarbons are the predominant plasticer.

\* \* \* \* \*